(No Model.) 6 Sheets—Sheet 1.

Z. T. FRENCH & W. C. MEYER.
LEATHER GOUGING MACHINE.

No. 381,994. Patented May 1, 1888.

WITNESSES.
Howard F. Eaton
John F. C. Prinkert

INVENTORS.
Zachary T. French,
William C. Meyer,
by Crosby & Gregory attys.

(No Model.) 6 Sheets—Sheet 2.

Z. T. FRENCH & W. C. MEYER.
LEATHER GOUGING MACHINE.

No. 381,994. Patented May 1, 1888.

WITNESSES
Howard F. Eaton.
John F. C. Prinkert

INVENTORS
Zachary T. French,
William C. Meyer.
By Leroy Gregory Attys

(No Model.) 6 Sheets—Sheet 3.

Z. T. FRENCH & W. C. MEYER.
LEATHER GOUGING MACHINE.

No. 381,994. Patented May 1, 1888.

WITNESSES
Howard F. Eston.
John F. C. Preinkert.

INVENTORS.
Zachary T. French
William C. Meyer
By Crosby & Gregory
Attys.

(No Model.) 6 Sheets—Sheet 4.

Z. T. FRENCH & W. C. MEYER.
LEATHER GOUGING MACHINE.

No. 381,994. Patented May 1, 1888.

WITNESSES.
Howard F. Eaton.
John F. C. Preinkert.

INVENTORS.
Zachary T. French.
William C. Meyer.
by Crosby & Gregory, attys.

(No Model.) 6 Sheets—Sheet 5.

Z. T. FRENCH & W. C. MEYER.
LEATHER GOUGING MACHINE.

No. 381,994. Patented May 1, 1888.

WITNESSES
Howard P. Eaton.
John F. C. Brinkert.

INVENTORS.
Zachary T. French,
William C. Meyer.
by Crosby & Gregory Attys (No Model.) 6 Sheets—Sheet 6.

Z. T. FRENCH & W. C. MEYER.
LEATHER GOUGING MACHINE.

No. 381,994. Patented May 1, 1888.

Witnesses.
Fred. S. Greenleaf
Fred L. Emery

Inventors
Zachary T. French
William C. Meyer
by Crosby & Gregory,
Attys.

UNITED STATES PATENT OFFICE.

ZACHARY T. FRENCH AND WILLIAM C. MEYER, OF BOSTON, MASSACHUSETTS.

LEATHER-GOUGING MACHINE.

SPECIFICATION forming part of Letters Patent No. 381,994, dated May 1, 1888.

Application filed April 22, 1887. Serial No. 235,770. (No model.)

*To all whom it may concern:*

Be it known that we, ZACHARY T. FRENCH and WILLIAM C. MEYER, both of Boston, county of Suffolk, and State of Massachusetts, have invented an Improvement in Gouging-Machines, of which the following description, in connection with the accompanying drawings, is a specification, like letters on the drawings representing like parts.

This invention has for its object to construct a machine for gouging or removing from one side of a piece of leather or other soft material a small piece of any suitable shape or thickness, the machine being herein especially adapted to remove an oval-shaped piece, convex on one side, from a piece of leather which is cut of suitable shape to form a button-hole piece for button-gaiters to thereby leave oval-shape concavities in the leather, substantially as represented in United States Patent No. 330,944, dated November 24, 1885.

In the form in which our invention is herein shown as embodied, the leather to be gouged is supported upon a bed, is acted upon by a rotary cutter carried by a suitable shaft having a movement in the arc of a circle above or adjacent to the bed, the axis of the shaft for vibrating the said cutter being substantially parallel with the bed, the movement of the cutter being such as to gouge or remove a small piece from the exposed side of the leather. The leather is fed forward intermittingly by feeding devices, preferably made adjustable, to feed the material forward more or less at each step, as required. The bed on which the material is laid, and over which it is fed to be gouged, is made yielding to compensate for inequalities of stock, suitable clamping devices being employed to hold the material firmly in the path of movement of the cutter at the time the latter is moved over the bed to gouge the material. The clamping or holding-down devices are operated in such manner as to release the material intermittingly in order that it may be fed forward by the feeding device. Suitable mechanism is also provided for varying the number of movements or strokes of the feeding device required to completely feed the button-hole strip over the bed, the number of movements preferably corresponding with or determining the number of button-holes contained in the strip.

The main frame-work A, supported by the legs A', is of suitable shape to support the operating parts.

Figure 1:
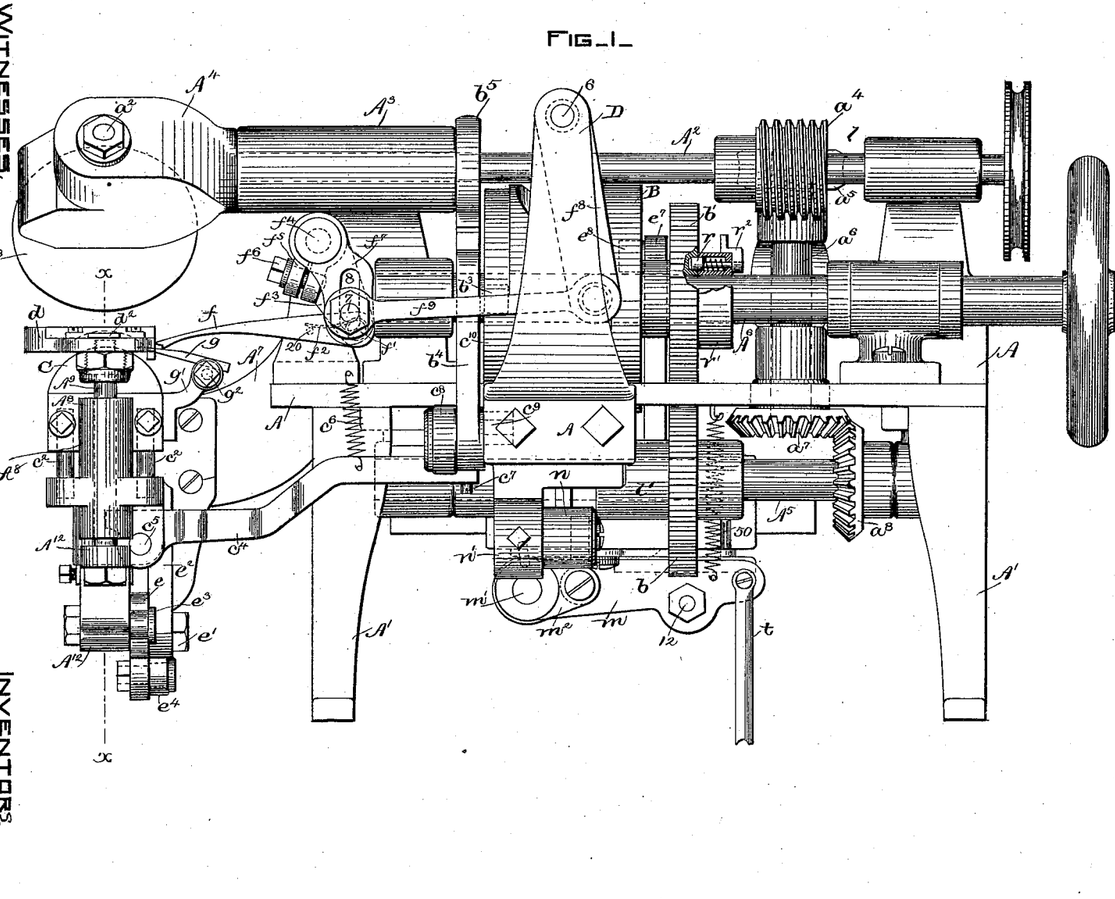
Figure 1 shows in front elevation a leather-gouging machine embodying this invention.
Figure 3:
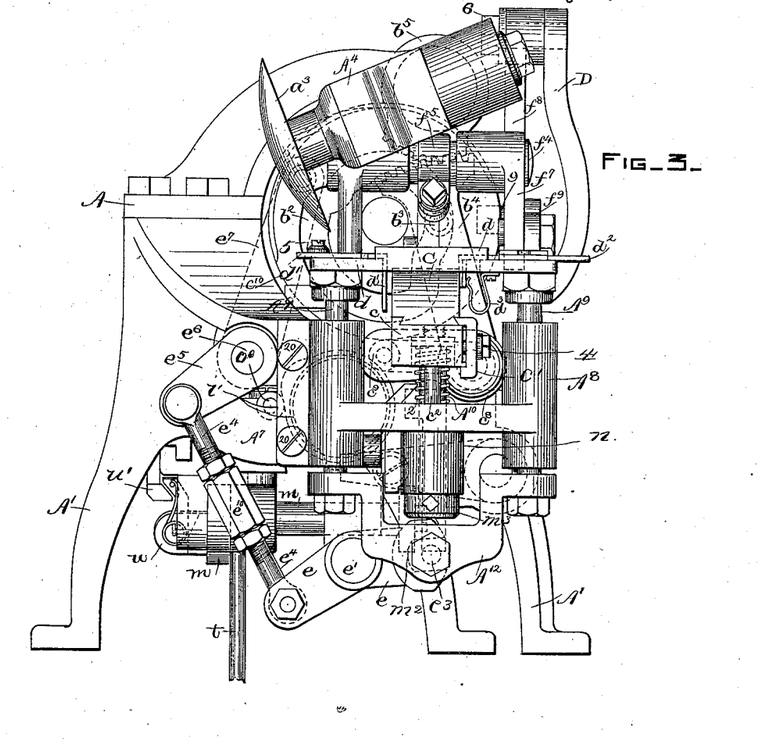
Fig. 3, a left-hand end view of the machine shown in Fig. 1.
Figure 4:
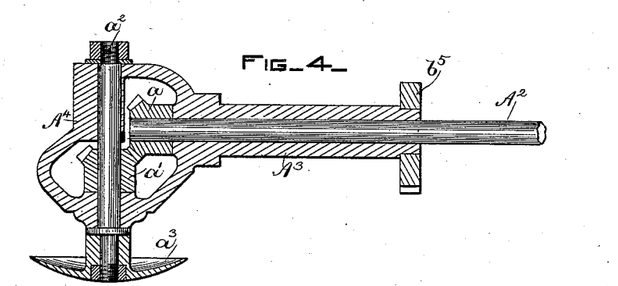
Fig. 4, a detail of the rotary cutter.

The main drive-shaft $A^2$, having its bearing in suitable uprights of the main frame-work, has sleeved upon one end of it a rotatable cutter-carrying head composed of an arm, $A^3$, (see Figs. 1, 3, and 4,) and an enlarged recessed head, $A^4$. The shaft $A^2$ within the head $A^4$ has secured to it a bevel-gear, $a$, which meshes with a bevel gear, $a'$, secured to a short vertical shaft, $a^2$, having its bearing in the head $A^4$, the said shaft having secured to it the cutter $a^3$, herein shown as concavo-convex, the cutter being rotated by the shaft $A^2$. The cutter-carrying head has attached to it a sector, $b^5$, engaged by a pivoted segment, $b^4$, (see Figs. 1 and 3,) adapted to be vibrated by means hereinafter described, so that as the shaft $A^2$ is rotated to rotate the cutter $a^3$ the cutter-carrying head may be vibrated to move the cutter in the arc of a circle about the said shaft $A^2$ as an axis.

The shaft $A^2$ is provided with a worm, $a^4$, which engages a toothed wheel, $a^5$, secured to a vertical shaft, $a^6$, carrying a bevel-gear, $a^7$, which meshes with the bevel-gear $a^8$, secured to the horizontal shaft $A^5$, having its bearing in the main frame-work of the machine.

The shaft $A^5$ has sleeved upon it a toothed wheel, $b$, which engages a toothed wheel, $b'$, secured to the cam-shaft $A^6$, having its bearings in the main frame-work, the said shaft $A^6$ having secured to it the hub B, provided with several cam grooves and surfaces, to be described. The toothed wheel $b$ is driven by a suitable clutch mechanism, to be described.

Figure 7:
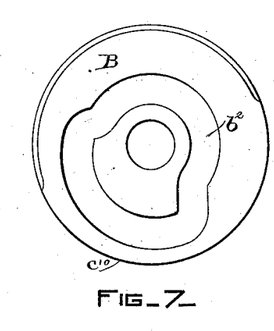
Figure 8:
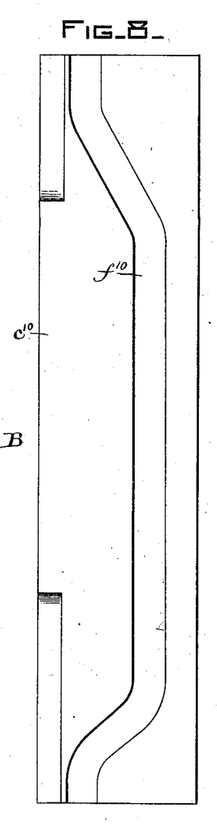
Figure 9:
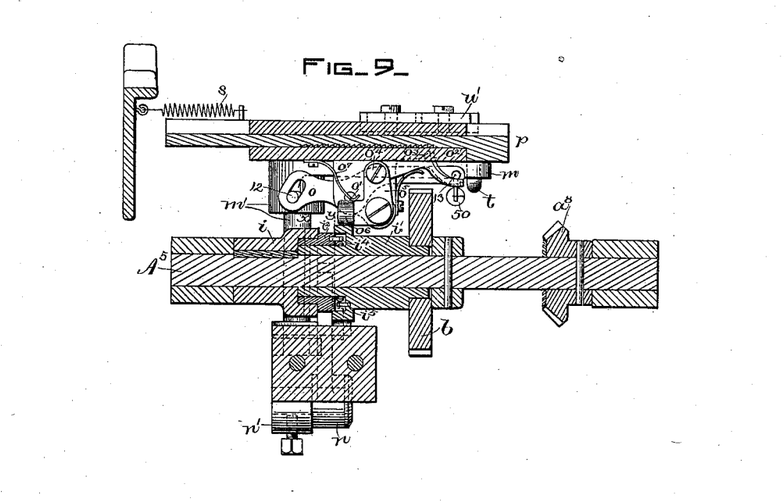
Fig. 9, a horizontal section of the adjusting device for varying the movement of the feeding device, shown on a somewhat smaller scale.

One face of the hub B (see Fig. 7) is provided with a cam-groove, $b^2$, which receives a stud, $b^3$ (see dotted lines, Figs. 1 and 3,) projecting laterally from the toothed segment $b^4$, described as instrumental in vibrating the cutter-carrying head, the said segment being pivoted at its lower end to a stud projecting from the main frame-work.

Figure 5:
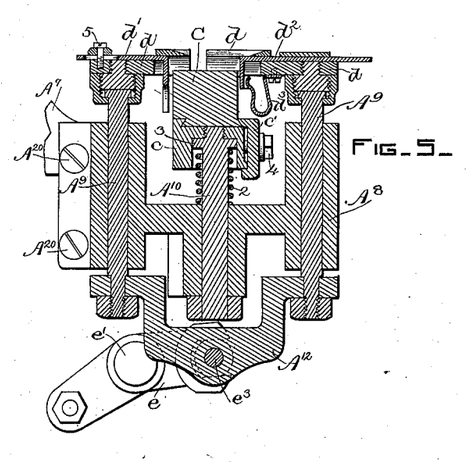
Fig. 5, a vertical section on the line $x\ x$, Fig. 1, of the bed over which the material is fed.
Figure 14:
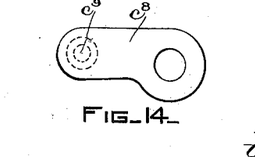
Figure 15:
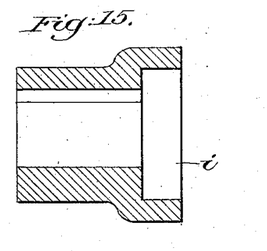
Figure 16:
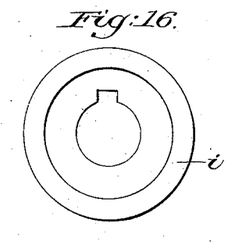

The bed C, having a curved or concaved top, upon which the material to be gouged or severed is placed, has a shank or rod, $A^{10}$, which enters a bracket or frame, $A^8$, secured by bolts $A^{20}$ to an arm, $A^7$, secured to the main frame-work of the machine, the said shank or rod being surrounded by a spring, 2, one end of which bears against the frame $A^8$, while the opposite end of the spring bears against a flange, 3, at or near the upper end of the rod $A^{10}$. The upper end of the rod $A^{10}$, as herein shown, is not connected directly to the table, but rather to a block, $c$, having at its upper surface a dovetailed groove, which receives a dovetailed block, C, attached to the bed proper. The grooved block $c$ is preferably made in two parts, as shown in Fig. 5, the part $c'$ being fixed to the main portion of the block by a set-screw, 4, so that the bed proper, C, may be removed easily and another bed proper having a curved bearing-surface of different radius substituted. The block $c$ is provided with guide pins or studs $c^2$, which enter sockets in the frame $A^8$. The rod $A^{10}$ is locked in position to co-operate with the holding-down plate $d$, to be described, and firmly hold the material upon the bed by a locking-lever, $c^4$, pivoted at $c^5$ (see Fig. 1,) one end of the said lever engaging the rod $A^{10}$, the opposite end thereof being sustained by the spring $c^6$, the lever having an adjusting-stud, $c^7$, which is struck at intervals by an arm or hub, $c^8$, loosely pivoted to a stud projecting from the frame-work, said arm $c^8$ (shown separately in Fig. 14) carrying a roller or stud, $c^9$, (see dotted lines, Fig. 1,) located within the range of movement of the cam $c^{10}$ of the hub B, so that at each revolution of the hub the lever $c^4$ will be moved on its pivot to lift and lock the yielding bed C firmly in position while the cutter acts to gouge or cut the leather or material being fed over the bed C beneath the holding-down plate $d$, secured to the upper ends of two rods, $A^9$ $A^9$, sliding in bearings in the frame $A^8$, said rods $A^9$ $A^9$ being connected to a rising and falling yoke, $A^{12}$, the plate $d$ being correspondingly made to rise and fall with relation to the bed C, to hold firmly in place any material laid upon the said bed.

Two edge guides, $d'$ $d^2$, composed of flat pieces of metal bent into angular shape, (see Fig. 5,) are arranged to slide in grooved recesses cut in or secured to the holding-down plate $d$, one of the said guides, as $d'$, being made adjustable toward and from the bed C by a set-screw, 5, the other guide, $d^2$, being continuously retained in contact with one side of the bed C, or some other fixed support, by a spring, $d^3$. The guide $d'$ may be adjusted to vary the distance from the edge of the material at which the cutter commences to enter, cut, or gouge the material, the guide $d^2$ readily yielding for different widths of material passing over the bed.

Figure 2:
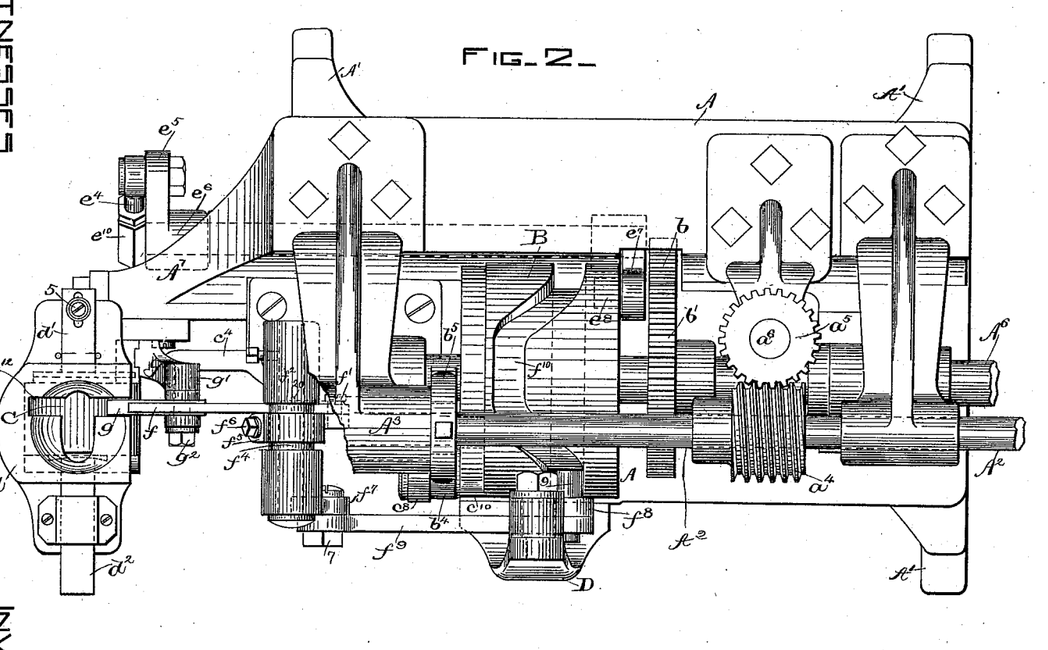
Fig. 2, a top view of the machine shown in Fig. 1, the arm $A^3$, the head $A^4$, and the cutter to be described being broken out.

The holding-down plate $d$ above the bed C is provided in this instance with an opening of oval shape, as best shown in Fig. 2, through which opening the rotary cutter $a^3$ obtains access to the material upon the said bed.

Figure 6:
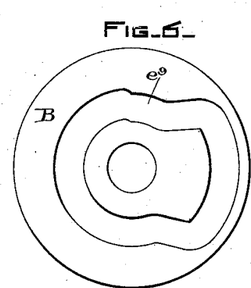
Figs. 6, 7, and 8, details of the actuating-cams to be described.

The yoke $A^{12}$ is raised and lowered to cause the holding-down plate $d$ to clamp the material upon the bed by means of a lever, $e$, pivoted on a stud, $e'$, held in a projection, $e^2$, of the main frame-work, one end of the said lever $e'$ engaging a stud, $e^3$, projecting laterally from the yoke $A^{12}$, the opposite end of the said lever $e$ being connected by an adjustable connecting-rod, $e^4$, with an arm, $e^5$, secured to one end of a horizontal rock-shaft, $e^6$, having its bearing in the main frame, the said rock-shaft having at its opposite end an arm, $e^7$, (see dotted lines, Fig. 3,) provided with a stud, $e^8$, (see Figs. 1 and 2,) which enters a cam groove, $e^9$, (see Fig. 6,) cut in the face of the hub B opposite the cam-groove $b^2$.

It will be seen that as the hub B rotates, the rock-shaft $e^6$ may be operated to raise and lower the yoke $A^{12}$. A turn-buckle or nut, $e^{10}$, is employed for adjusting the connecting-rod $e^4$ to vary the extent of vertical movement of the holding-down plate $d$.

The object of the cutter herein described is to remove from rather thick leather or material small pieces thereof between the button-hole slits, in order that the button-hole piece made of thick material may be sufficiently flexible to be easily manipulated by the wearer. The leather or material to be so cut by the cutter $a^3$ is fed upon the table C from a bevel-faced rest or plate, $g$, adjustably secured to an arm, $g'$, by a set-screw, $g^2$. The button-hole slits cut in the material at proper distances apart are engaged by a finger, $f$, loosely pivoted to a stud, $f'$, (see dotted lines, Fig. 1,) projecting from an arm, $f^3$, secured to a short shaft, $f^4$, by suitable clamping devices, herein shown as a split collar, $f^5$, held together by a screw, $f^6$. The finger $f$ is held down by a spring, $f^2$, encircling the stud $f'$ and bearing against a stud, 20, projecting laterally from the finger. The shaft $f^4$ is rocked by an arm, $f^7$, fixed to it, said arm $f^7$ being connected with an arm, $f^8$, pivoted at 6 to an upright, D, by a connecting-rod, $f^9$. That end of the connecting-rod $f^9$ joined with the arm $f^7$ is provided with a stud, 7, which enters a curved slot, 8, cut in the arm $f^7$, so that the point of connection between the connecting-rod $f^9$ and the rod $f^7$ may be varied to vary the throw of the arm and thereby the throw of the finger $f$. The lower end of the arm $f^8$ is provided with a roller or other stud, 9, (see Fig. 2,) which enters a cam-groove, $f^{10}$, cut in the surface of the hub B, so that as the hub rotates, movement is imparted to the arm $f^8$, and hence to the finger $f$. The finger $f$ enters a transverse slot, $f^{12}$, (see Fig. 2,) cut in the holding-down plate, $d$, and, being held down by the spring $f^2$, engages one after another of the button-hole slits of the material when the plate $d$ is in its elevated position. As the finger is moved forward the material will be moved over the bed C. The holding-down plate $d$ then clamps the material, after which the finger returns to its normal position, and lastly the rotating cutter $a^3$ operates.

The movement of the finger $f$ is such that it may enter the button-hole slits in succession; but if it is desired, the feeding-finger may be made to engage the material directly and move it forward intermittingly, so that we do not desire to limit ourselves to the particular construction of the feeding-finger herein shown; nor do we desire to limit the invention and the particular devices herein shown for moving or operating the feeding devices.

To feed the material forward a definite number of steps—that depending upon the number of button-holes contained in the strip—we employ a controlling mechanism which permits the machine to operate to gouge a strip of leather a definite number of times, the said controlling mechanism being adjustable to vary the number of times.

Figure 10:
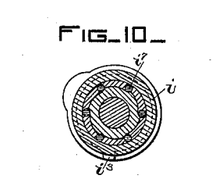
Figs. 10 to 24, inclusive, show details of the clutch and controlling mechanism therefor, to be described.
Figure 11:
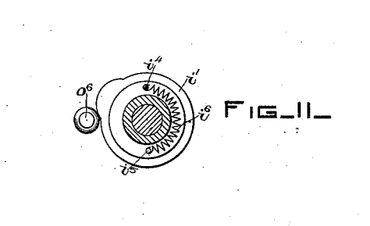
Figure 12:
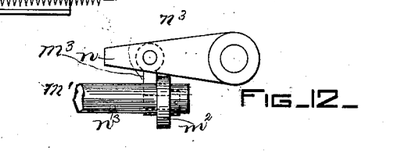
Figures 17, 18, 19, 20, 21, 22, 24:
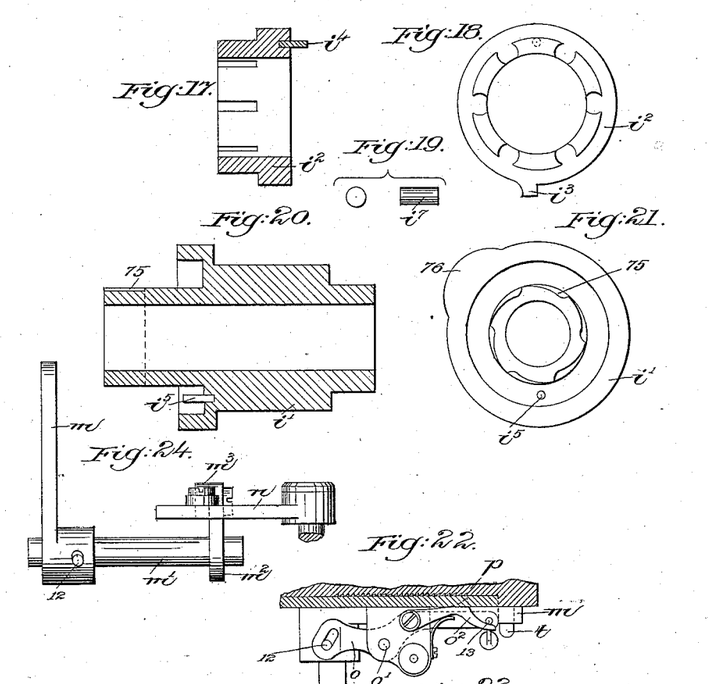
Figure 23:
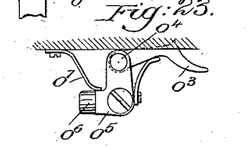

The controlling mechanism herein shown consists of a friction ratchet-clutch mechanism mounted upon the shaft $A^5$, which is controlled by a treadle. The clutch mechanism herein shown (see Figs. 9, 10, and 11, and 15 to 21, inclusive) consists, essentially, of a recessed hub, $i$, splined to the shaft $A^5$, and another recessed hub, $i'$, mounted loosely on said shaft, the said recessed hub $i'$ being the sleeve to which the toothed wheel or gear $b$ is fixed. A collar or ring, $i^2$, having a suitable stop projection, $i^3$, surrounds the projecting shank portion of the hub or sleeve $i'$ between the two hubs. The ring $i^2$ is provided with a pin, $i^4$, and the hub or sleeve $i'$ is provided with a similar pin, $i^5$, (see Figs. 11 and 20,) these two pins being connected by a spring, $i^6$. Suitable rollers or balls, $i^7$, (see Figs. 10 and 19,) are interposed between the shank portion of the clutch and the hub $i$, so that when the ring $i^2$ is released by an arm, $n$, to disengage the stop projection $i^3$, the spring $i^6$ will act to move or start the said ring sufficiently forward to cause the rollers or balls to move upward upon the inclined surface 75 of the shank portion of the hub and be wedged between the said shank portion and the hub $i$, to thereby rigidly connect the two hubs together. This clutch mechanism we do not herein claim, as the same is not of our invention; and while we prefer to employ the form herein shown, it is obvious that we may employ any other well-known form of clutch mechanism capable of accomplishing the results desired.

Figure 13:
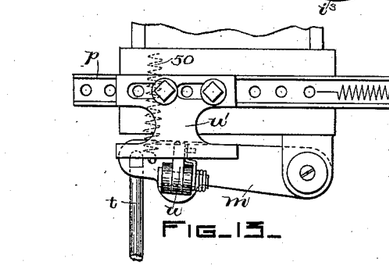

To start the machine, a treadle-rod, $t$, (see Figs. 1, 3, 9, 13, and 24,) is depressed, moving the lever $m$, secured to the shaft $m'$, said shaft having secured to its opposite end an arm, $m^2$, which is connected with the arm $n$ by a connecting-link, $m^3$, said arm $n$ being pivoted to a stud passing through the projection $n'$ and normally lying in the path of rotation of the ring $i^2$ of the clutch mechanism, to thereby engage the projection $i^3$ of the said clutch mechanism. The hub of the arm $m$ is provided with a pin or stud, 12, (see Figs. 9 and 22,) which enters a slot in one end of a lever, $o$, pivoted at $o'$, the opposite end of the said lever having a pin, 13, against which bears the outer end of the two feed-dogs $o^2$ $o^3$, having sharp teeth-like portions which engage and move a ratchet-toothed bar, $p$, sliding horizontally in suitable guideways. The slot in the lever $o$, which receives the stud 12, is made diagonal, so that as the hub is rocked by depression of the treadle $t$ the lever $o$ will be moved to permit both feed-dogs to engage the ratchet-toothed bar $p$. One of the feeding-dogs, as $o^2$, is pivoted to the frame-work and controlled by a spring, and the other feed-dog, as $o^3$, is loosely pivoted on a stud, $o^4$, carried by one arm of a bell-crank lever, $o^5$, the other arm of the said bell-crank lever carrying a roller or stud, $o^6$, which bears against the cam-surface 76 of one member, as $i'$, of the clutch mechanism, such cam-surface comprising a boss or projection to move the lever once during each revolution of the clutch, so that as the clutch mechanism rotates the bell-crank lever will be moved to thereby move the engaging feed-dog $o^3$ forward, that it may engage the next tooth of the ratchet-toothed bar, the other feed-dog, $o^2$, at such time holding the ratchet-toothed bar against the tension of the spring $s$, continuously acting to return the ratchet-toothed bar to its normal position. The bell-crank lever $o^5$ is acted upon by a spring, $o^7$. A short bar or plate, $u'$, (see Figs. 3 and 13,) is adjustably secured to the ratchet-toothed slide-bar $p$, said plate having at its lower side or edge a guiding portion comprising inclined surfaces at each side, and a spring-controlled or yielding retaining-finger, $u$, is attached to the rear side of the arm $m$, the outer end of said finger having at each side an inclined bearing-surface and bearing against one or the other side of the guide portion of the plate $u'$, depending upon which way the said plate is moving. As the arm $m$ is depressed and the ratchet-toothed bar moved ahead, say one tooth, by the feed-dog $o^3$, the plate $u'$ attached to said bar is consequently moved ahead and over the finger $u$ attached to said arm $m$, and said finger bearing at such time against the outer inclined side of the guide portion of the plate $u'$, the arm $m$ will thus be held depressed without further aid of the treadle until the plate $u'$ is moved by the finger $u$, when the said finger returns to its normal position with the arm $m$ by the aid of the spring 50. (See dotted lines, Fig. 13.) The inner side of the bar $u'$ being inclined, as described, so also the outer side of the retaining-finger $u$, permits the plate $u'$ and attached ratchet-toothed slide-bar $p$ to return to their normal position by means of the spring $s$, as soon as the said plate has passed the bar, it being understood that the feed-dogs are both disengaged by the pivoted lever $o$ when the arm $m$ returns to its normal position.

By the employment of the bar or plate $u'$ and the spring-controlled retaining-finger $u$ the lever $m$, once depressed by the treadle $t$, may be held depressed as long as the said spring-controlled retaining-finger $u$ is retained by the bar or plate $u'$ and no longer.

It will thus be seen that by securing the bar $u'$ to the ratchet-toothed slide-bar $p$ at different points the retaining-finger will be released at different times, or by making the bar $u'$ of different lengths this feature could be accomplished.

By the controlling mechanism herein described the treadle may be once depressed, the material automatically fed over the yielding-bed, clamped by the holding-down plate $d$, acted upon by a rotary cutter, and released, to be again fed as many times as the ratchet-toothed bar $p$ may be moved tooth by tooth until the retaining-finger has passed by the bar $u'$, or has been otherwise released to permit the lever $m$, controlled by the treadle $t$, to resume its normal position.

A spring-controlled detent, $r$, (see Fig. 1,) is mounted in a hub, $r'$, said spring-controlled detent entering a socket in the face of the toothed wheel $b'$, and adapted to be released against the tension of the spring by a finger, $r^2$, secured to the shank of the detent and capable of being rotated and locked against the face of the hub $r'$, so that the shaft $A^6$ may be rotated independently by a hand-wheel, or by power, if desired.

By the construction and arrangement of the driving shaft with relation to the others being driven it will be understood that while the drive-shaft rotates continuously, to thereby continually rotate the cutter at a high speed, the shaft operating the clutch also rotates continuously, and the devices controlled by or deriving their motion through the interposition of the clutch mechanism of the construction herein shown, or its equivalent, operate at the will of the operator.

We claim—

1. In a leather-gouging machine, a bed over which the leather or other material is passed, combined with a revolving cutter and an oscillating carrying-head for the cutter, substantially as described.

2. In a machine for gouging leather, the bed over which the leather or other material is fed, combined with a cutter, its shaft and a swiveled or pivoted head carrying the said cutter and lying in a plane parallel with the bed, whereby the cutter may revolve on its own axis, and also move in the arc of a circle above or near the bed, substantially as described.

3. In a machine for gouging leather or other material, the bed having a convexed surface to receive the material, combined with a revolving cutter, and means, substantially as described, for moving in the arc of a circle above the convex-surfaced bed to remove a piece having one convexed side from the exposed side of the material, substantially as described.

4. The bed to receive the material and the rotary cutter, with means, substantially as described, for moving it in a curved arc over the bed, combined with an intermittent feeding device for automatically feeding the material forward, substantially as described.

5. In a leather-gouging machine, the bed to receive the material, the cutter, and means, substantially as described, for revolving it, combined with a pivoted oscillating head carrying the cutter, and means for oscillating the said head, substantially as described, whereby the revolving cutter is moved in the arc of a circle adjacent to the bed, as set forth.

6. The bed and feeding device to feed the material over the bed, and a holding-down device to hold the material firmly, combined with a cutter arranged to travel over the bed, by means, substantially as described, to remove a small chip from the exposed side of the material, substantially as described.

7. The yielding bed, a locking device for it, the holding-down device, means, substantially as described, for moving it, and an intermittent feeding device arranged to feed the material forward between the bed and the holding-down device when the latter is disengaged from the bed, combined with a cutter arranged to travel over the bed in a curved path, substantially as described.

8. The yielding bed-support and the removable bed proper having a curved bearing-surface, combined with a holding-down plate, and the guides arranged at each end of the bed proper, substantially as described.

9. In a leather-gouging machine, the bed to receive the material, the revolving cutter, and means, substantially as described, for moving in a curved arc over the bed, combined with a holding-down device for the material placed upon the bed, substantially as described.

10. The yielding bed-support and the holding-down plate having an oval-shaped opening therein, combined with an adjustable guide, $d'$, and the yielding guide $d^2$, substantially as described.

11. The yielding bed upon which the material is placed and the holding-down plate, and adjusting mechanism, substantially as described, for moving the holding-down plate to retain the material firmly upon the bed and compensate for different thickness of stock, substantially as described.

12. In a leather-gouging machine, the bed, holding-down device, and cutter, combined with a feeding-finger, and means, substantially as described, moved by the cam-grooved hub for actuating the feeding-finger, and adjusting means for varying the throw of the feeding-finger, substantially as described.

13. In a leather-gouging machine, the bed and oscillating cutter, combined with means, substantially as described, controlled by the shaft $A^5$, for permitting the cutter to operate, and the clutch mechanism for throwing said means into engagement with the shaft $A^5$, and a controlling mechanism, substantially as described, for automatically disengaging the clutch mechanism after the said shaft $A^5$ has made a certain number of revolutions, as set forth.

14. In a leather-gouging machine, the yielding bed, the holding-down device for holding the material firmly upon the bed, and an intermittent feeding device, substantially as described, combined with a rotary cutter carried by a swivel or pivoted carrying-head, whereby the cutter is given two movements—viz., about its own axis and about an axis parallel with the surface of the bed—substantially as described.

15. In a leather-gouging machine, the bed, and the intermittent feeding device, substantially as described, for feeding the material intermittingly over the bed, combined with a cutter, its shaft, the swiveled or pivoted carrying-head for the shaft and cutter, whereby the cutter is both rotated about its own axis and moved in a curved path above the bed, and means for vibrating or swinging the cutter-carrying head back and forth, substantially as described.

16. In a leather-gouging machine, the leather cutting and feeding devices, combined with a controlling mechanism comprising a clutch mechanism and means for releasing it, the lever $o$, controlled by said means for throwing the feed-dogs into engagement with the ratchet-toothed bar $p$, means for moving the ratchet-toothed bar $p$ forward step by step, and adjusting mechanism for automatically stopping the rotation of the clutch mechanism and for returning the ratchet-toothed bar $p$ to its normal position at any time desired, substantially as described.

In testimony whereof we have signed our names to this specification in the presence of two subscribing witnesses.

ZACHARY T. FRENCH.
WILLIAM C. MEYER.

Witnesses:
G. W. GREGORY,
B. J. NOYES.